T. J. WHITMORE.
MACHINE FOR CLEANING AND STEMMING PEANUTS.
APPLICATION FILED SEPT. 19, 1911. RENEWED JULY 19, 1912.
1,042,859.
Patented Oct. 29, 1912.
3 SHEETS—SHEET 2.
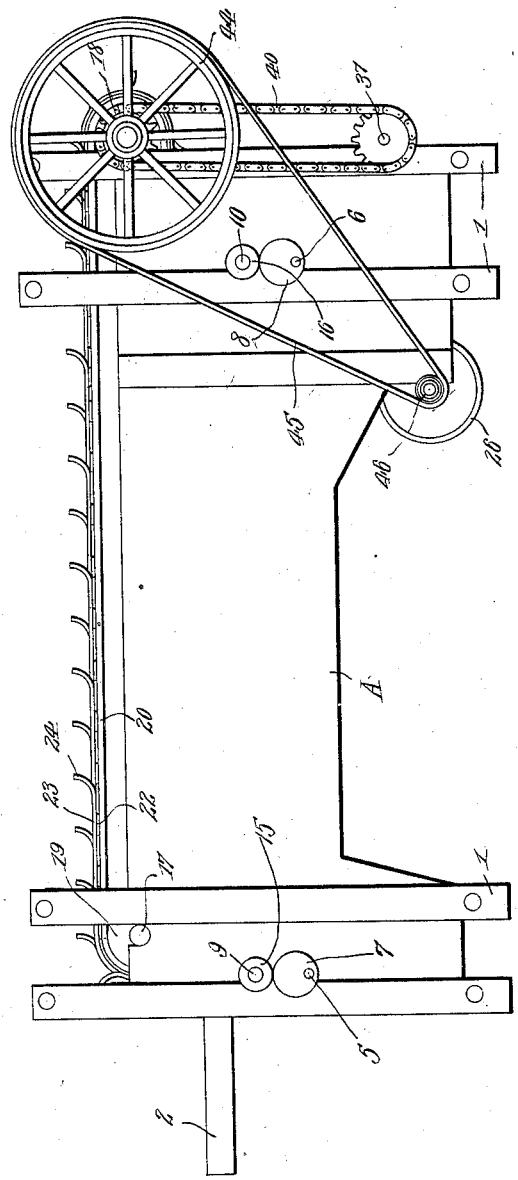
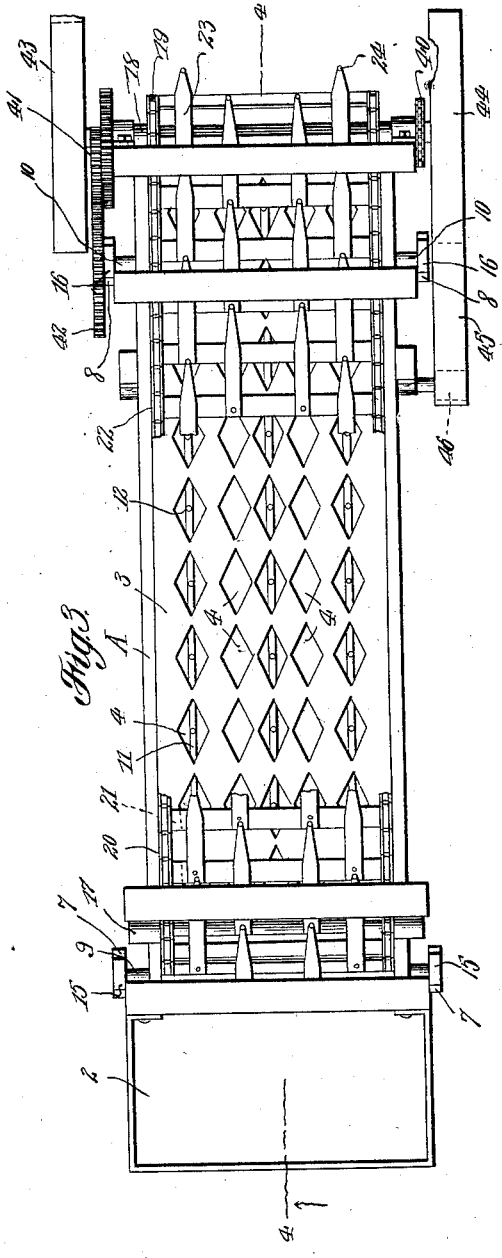
Witnesses
J. H. Crawford
Wm. Bagger
Inventor
Thomas J. Whitmore,
By Victor J. Evans
Attorney T. J. WHITMORE.
MACHINE FOR CLEANING AND STEMMING PEANUTS.
APPLICATION FILED SEPT. 19, 1911. RENEWED JULY 19, 1912.
1,042,859.
Patented Oct. 29, 1912.
3 SHEETS—SHEET 3.
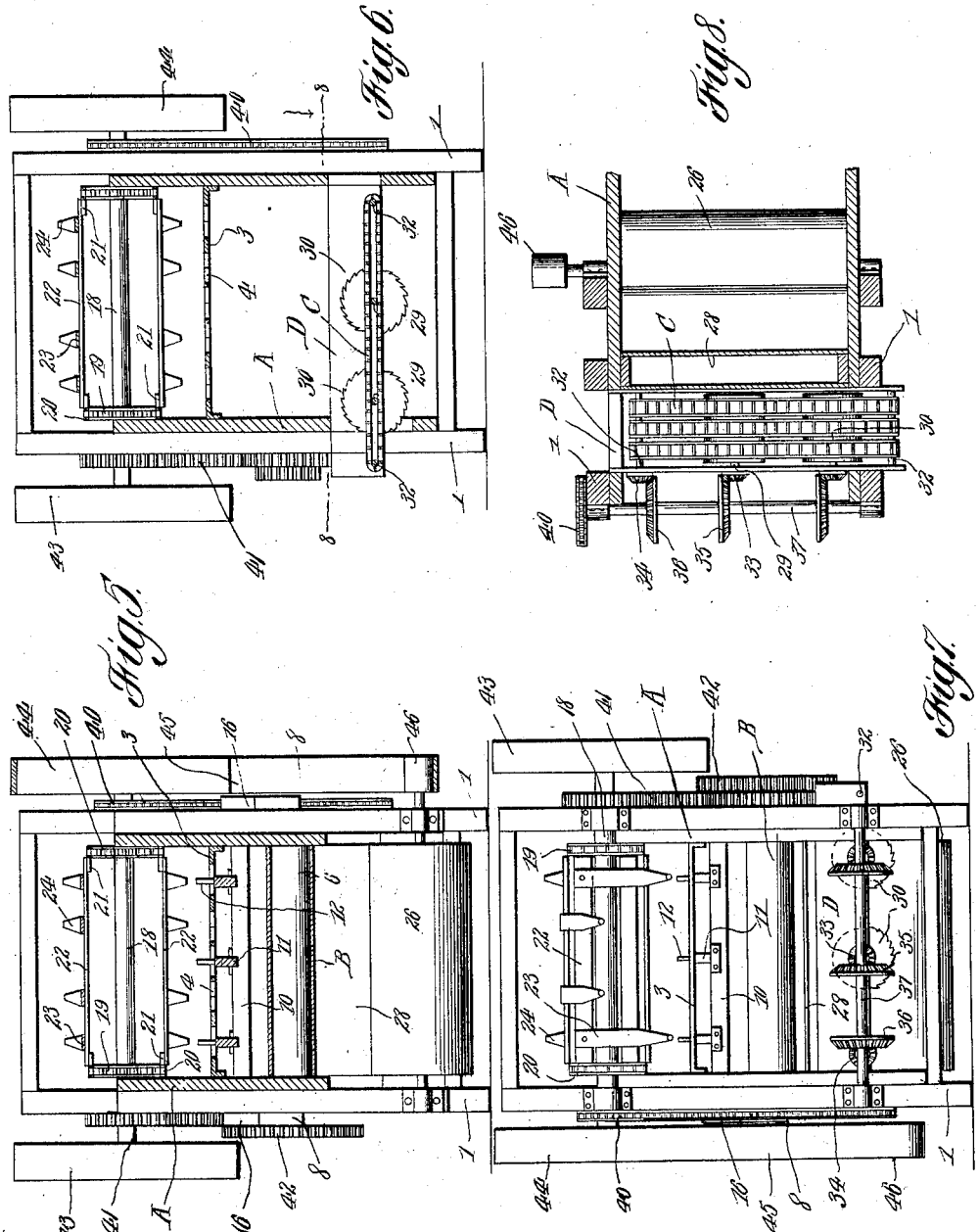
Witnesses
Inventor
Thomas J. Whitmore,
By Victor J. Evans
Attorney

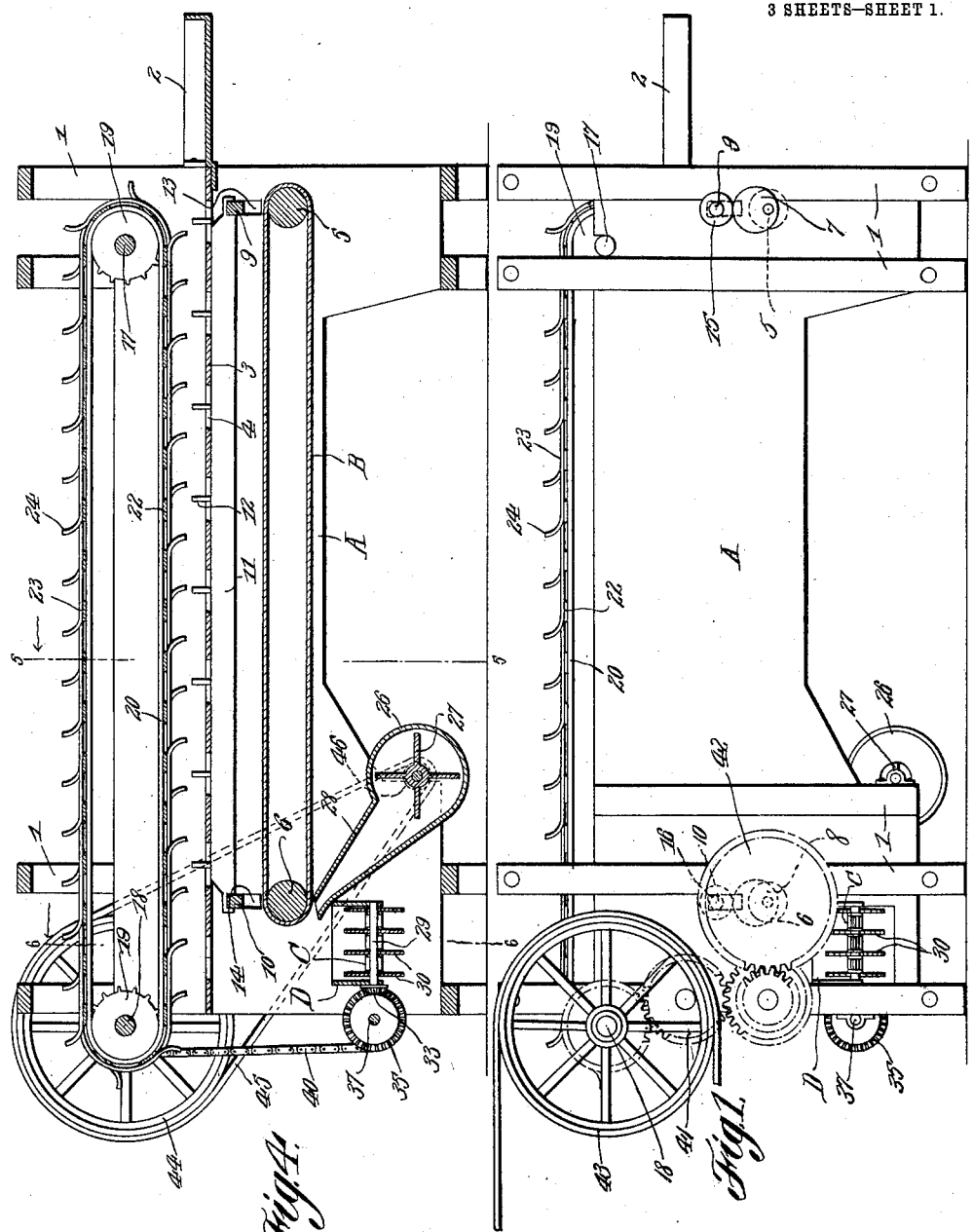

UNITED STATES PATENT OFFICE.

THOMAS J. WHITMORE, OF DENDRON, VIRGINIA, ASSIGNOR TO TIDEWATER PEANUT HARVESTER CORPORATION, OF DENDRON, VIRGINIA, A CORPORATION OF VIRGINIA.

MACHINE FOR CLEANING AND STEMMING PEANUTS.

1,042,859.     Specification of Letters Patent.     Patented Oct. 29, 1912.

Application filed September 19, 1911, Serial No. 650,149. Renewed July 19, 1912. Serial No. 710,488.

*To all whom it may concern:*

Be it known that I, THOMAS J. WHITMORE, a citizen of the United States of America, residing at Dendron, in the county of Surry and State of Virginia, have invented new and useful Improvements in Machines for Cleaning and Stemming Peanuts, of which the following is a specification.

This invention relates to means for cleaning and stemming peanuts, and it has for its object to produce an organized machine of this class which shall be simple in construction and thoroughly effective in operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a machine constructed in accordance with the invention. Fig. 2 is a side elevation of the machine as seen from the opposite side. Fig. 3 is a top plan view with parts broken away to show the subjacent construction. Fig. 4 is a longitudinal vertical sectional view taken on the line 4—4 in Fig. 3. Fig. 5 is a transverse sectional view taken on the line 5—5 in Fig. 4. Fig. 6 is a transverse sectional view taken on the line 6—6 in Fig. 4. Fig. 7 is a rear elevation. Fig. 8 is a horizontal sectional detail view taken on the line 8—8 in Fig. 6.

Corresponding parts in the several figures are denoted by like characters of reference.

The casing A of the improved machine is provided with legs or uprights 1, 1 whereby it is supported, said casing being of any suitable construction to contain and support the operating mechanism.

Supported at the front end of the casing is a feed table 2 over which the vines may be fed to a screen 3, said screen being provided with diamond-shaped slots or openings 4 of suitable size to permit the nuts as they become detached from the vines to pass to an endless carrier B located beneath said screen. The carrier B consists of an endless apron which is guided over shafts 5, 6 which are disposed, respectively, adjacent to the front and rear ends of the casing. The shafts 5 and 6 are provided with eccentrics 7 and 8, said eccentrics being disposed externally adjacent to the side walls of the casing through which the shafts 5, 6 extend.

Disposed longitudinally within the casing, beneath the screen 4 and above the carrier B, is an agitator comprising front and rear cross bars 9, 10 which are connected by longitudinal ribs 11 having upwardly extending teeth 12 that project through some of the diamond shaped slots or openings 4 in the screen. The front and rear cross bars 9 and 10 project through slots 13, 14 in the sides of the casing and are provided with wheels or rollers 15, 16 that are supported upon the eccentrics 7, 8, whereby, when the machine is in operation, the agitator will be vibrated or reciprocated vertically.

Supported for rotation in suitable bearings adjacent to the front and rear ends of the casing are shafts 17, 18 each having sprockets 19 that serve to support endless chains or link belts 20, some of the links of which, disposed at suitable intervals, are provided with laterally extending lugs 21 which are connected together by slats or flights 22. Each of these flights is equipped with resilient arms 23 extending slightly beyond the flight following the one to which said arms are attached when the machine is in motion, said arms being provided at their free ends with teeth 24 which are bent at an angle to the arms, said teeth being directed toward the screen member 3 when opposed to the latter. The chains 20, together with the slats or flights 22 and the toothed arms 23, serve to constitute an endless beating device which coöperates with the screen and with the agitator to feed the vines from the front to the tail end of the machine and to subject said vines to a beating action, whereby the nuts will become detached from the halm, the nuts, stems and small impurities dropping through the apertures in the screen upon the endless conveyer B, whereby they are carried rearwardly in the casing, while the halm is discharged over the rear end of the screen, either on to the ground or upon some suitable conveyer whereby the refuse may be carried to a stack or place of deposit.

A housing 26 in which a fan 27 is mounted for rotation is constructed or arranged near the tail end of the casing, said housing being provided with a spout 28, whereby the blast from the fan is directed through the nuts and other material that is being conveyed rearwardly by the carrier B. The light refuse material will thus be blown out, while the nuts are permitted to drop upon an endless carrier C in a transversely disposed trough or casing D arranged below the delivery end of the carrier B. The sides of the casing D are provided with bearings for a plurality of shafts 29 carrying the stemming saws 30, and the carrier C is composed of a plurality of chains or link belts guided over shafts 32 adjacent to the ends of the casing D, said link belts passing between the saws 30 upon the shafts 29. The saw shafts 29 and one of the carrier shafts 32 are provided with bevel pinions 33, 34 meshing with bevel pinions 35, 36 upon a shaft 37 whereby the saws and the carrier C will be driven in the proper direction. The shaft 39 may be driven by means of a chain 40 from the shaft 18 which supports the rear end of the endless beater. Motion is also transmitted from the said shaft 18 through intermediate gearing 41 to a spur wheel 42 upon the shaft 6 which supports the rear end of the endless carrier B. The shaft 18 is provided with band wheels 43 and 44, the former of which is to be connected by a belt or band with a source of power such as a motor of any description, (not shown) whereby the machine may be driven, as will be readily understood.

From the foregoing description, taken in connection with the drawings hereto annexed, the operation and advantages of the invention will be readily understood. The vines are fed over the feed table at the front end of the machine upon the screen 3, where they are seized by the toothed arms 23 of the endless beater, being thereby carried rearwardly over the screen. As the agitator is reciprocated vertically, the teeth upon the longitudinal bars of said agitator are projected through the slots in the screen, thus intercepting the vines and causing the nuts to become detached by the terminal teeth 24 of the resilient arms 23. The nuts, together with vine impurities, will pass through the screen to the carrier B, being thereby conveyed to the tail end of the machine, where the material is discharged into the casing D, being at the same time subjected to the blast from the fan, whereby the light impurities are disposed of, thus permitting only the practically clean nuts to drop into the casing D upon the carrier C, whereby the nuts are subjected to the action of the stemming saw before being discharged at one side of the casing A. The halm is discharged as described over the tail end of the screen 3.

This machine, as will be seen, is extremely simple in its construction, and experience has proven it to be thoroughly effective in operation. In operation, power may be applied to any of the principal shafts, either at the front or at the tail end of the machine.

The shaft of the fan 27 has been shown as being equipped with a pulley 46 connected by a belt 45 with the band wheel 44 whereby the fan may be driven.

Having thus described the invention, what is claimed as new, is:—

1. In a machine of the character described, a screen, a reciprocatory agitator having teeth adapted to be projected through the slots in the screen, and an endless beater adapted to carry material over the screen and including flights provided with resilient arms having terminal teeth at an angle to said arms.

2. In a machine of the character described, a casing, a screen extending lengthwise through the casing, a reciprocatory agitator having teeth adapted to be projected upwardly through the slots in the screen, and an endless beater arranged to carry material over the surface of the screen.

3. In a machine of the character described, a casing, a screen extending longitudinally therethrough, a reciprocatory agitator supported below the screen and having teeth adapted to be projected upwardly through the slots in the screen to obstruct material passing over said screen, and an endless beater adapted to carry material over the surface of the screen.

4. In a machine of the character described, a beating device comprising endless chains, flights connecting said chains at intervals, and a plurality of spaced resilient arms extending from each flight beyond the following flight and having terminal teeth disposed at an angle to said arms.

5. In a machine of the character described, a casing having vertical slots, a screen extending longitudinally through the casing, an agitator disposed below the screen and having cross bars extending through the slots in the casing, said agitator being provided with teeth adapted to be projected upwardly through the screen, shafts supported for rotation below the cross bars, disks upon said cross bars, eccentrics upon the shafts, said eccentrics supporting the disks, a conveyer guided over the shafts, an endless beater arranged above the screen and adapted to carry material over the latter, and means for operating the endless beater and the endless carrier.

6. In a machine of the character described, a casing, a screen extending longitudinally therethrough, an endless beater supported above the screen and adapted to carry material over the same, an agitator supported below the screen and having teeth adapted to be projected upwardly through the screen, and means for projecting said agitator upwardly intermittently to dispose the teeth in the path of the endless beater.

7. In a machine of the character described, a screen, obstructing means movable through said screen in a plane substantially at right angles thereto, means for actuating the movable obstructing means to present the same alternately in obstructing and non-obstructing position with reference to the surface of the screen, and an endless beater coöperating with the screen and the obstructing means.

8. In a machine of the character described, a conveyer, a casing supported transversely below the discharge end of the conveyer, means for discharging an air blast between the conveyer and the transverse casing, saw carrying shafts in said casing, an endless carrier in the casing comprising a plurality of chains disposed intermediate the saws, and suitable operating mechanism.

In testimony whereof I affix my signature in presence of two witnesses.

THOMAS J. WHITMORE.

Witnesses:
FRANK W. ROGERS,
B. V. HARGROVE.

---

Copies of this patent may be obtained for five cents each, by addressing the "Commissioner of Patents, Washington, D. C."